US010082422B2

(12) United States Patent
Muramatsu

(10) Patent No.: US 10,082,422 B2
(45) Date of Patent: Sep. 25, 2018

(54) DETERMINATION APPARATUS AND METHOD FOR OCCUPANT

(71) Applicant: HONDA MOTOR CO., LTD., Tokyo (JP)

(72) Inventor: Yusuke Muramatsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 560 days.

(21) Appl. No.: 14/580,444

(22) Filed: Dec. 23, 2014

(65) Prior Publication Data
US 2015/0192454 A1 Jul. 9, 2015

(30) Foreign Application Priority Data

Jan. 7, 2014 (JP) .................................. 2014-000985

(51) Int. Cl.
G01G 23/06 (2006.01)
G01G 19/414 (2006.01)
(52) U.S. Cl.
CPC ......... G01G 23/06 (2013.01); G01G 19/4142 (2013.01)
(58) Field of Classification Search
CPC ........................... G01G 19/4142; G01G 23/06
See application file for complete search history.

(56) References Cited

U.S. PATENT DOCUMENTS 8,892,313 B2 * 11/2014 Fujii ...................... B60R 22/48 701/36
2012/0312604 A1 * 12/2012 Fujii .................. G01G 19/4142 177/1

FOREIGN PATENT DOCUMENTS

JP 2013-1152 A 1/2013

OTHER PUBLICATIONS

With English Translation of Japanese Office Action dated Dec. 16, 2015 (mailing dated), issued in related apanese Patent Application No. 2014-000985.

* cited by examiner

Primary Examiner — Mohamed Charioui
Assistant Examiner — Catherine Rastovski
(74) Attorney, Agent, or Firm — Westerman, Hattori, Daniels & Adrian, LLP

(57) ABSTRACT

An occupant determination apparatus includes a weight sensor that senses a weight of an object on a seat of a vehicle, a lateral acceleration sensor that senses lateral acceleration of the vehicle, and a processing unit that performs an operation of occupant determination. The processing unit calculates a lateral acceleration difference that is an absolute value of a difference between first lateral acceleration at a time when the weight passes through a first load threshold value and second lateral acceleration at a time when the weight passes through a second load threshold value. The processing unit performs the occupant determination based on an occupant determination threshold value when the lateral acceleration difference is smaller than a lateral acceleration difference threshold value, and does not perform the occupant determination when the lateral acceleration difference is larger than the lateral acceleration difference threshold value.

9 Claims, 8 Drawing Sheets

DETERMINATION APPARATUS AND METHOD FOR OCCUPANT

CROSS REFERENCES TO RELATED APPLICATIONS

The present application claims priority under 35 U.S.C. § 119 to Japanese Patent Application No. 2014-000985, filed Jan. 7, 2014, entitled "Determination Apparatus and Method for Occupant." The contents of this application are incorporated herein by reference in their entirety.

TECHNICAL FIELD

The present application relates to an occupant determination apparatus and an occupant determination method for determining an occupant or occupant type in a vehicle, and particularly relates to an occupant determination apparatus and an occupant determination method for determining an occupant seated on a seat equipped in a vehicle.

BACKGROUND

Vehicles are provided with air bags so as to protect, in case of collision, drivers and the other occupants in the vehicles. In regard to the activation of such air bags, techniques for appropriately controlling the air bags by determining whether the occupants are adults or children have been developed.

To determine whether the occupant seated on a seat equipped in a vehicle is an adult or a child, conventionally used is an occupant sensing apparatus in which an occupant load is determined with a load sensor arranged on one side of the seat and the occupant load is compared with a preset threshold value for occupant determination (see Japanese Unexamined Patent Application Publication No. 2013-1152).

The occupant sensing apparatus performs the occupant determination only when an absolute value of acceleration of the vehicle is equal to or smaller than a predetermined value so as to prevent erroneous determination caused by the weight shift of the occupant, which occurs at the time of cornering.

SUMMARY

The acceleration sensor that senses acceleration involves two kinds of errors, an offset error and a sensitivity error. Such errors may hinder correct occupant determination.

It is thus desirable for an occupant determination apparatus to prevent incorrect occupant determination by taking the errors of the acceleration sensor into account.

An occupant determination apparatus according to an aspect of an embodiment of the present application includes a weight sensor that senses a weight of an object on a seat of a vehicle, a lateral acceleration sensor that senses lateral acceleration, which is acceleration in a width direction of the vehicle, a storage unit that stores an occupant determination threshold value for occupant determination, a first load threshold value, a second load threshold value, and a lateral acceleration difference threshold value, and a processing unit that performs an operation of the occupant determination.

The processing unit sets the lateral acceleration at a time when the weight passes through the first load threshold value as first lateral acceleration, sets the lateral acceleration at a time when the weight passes through the second load threshold value as second lateral acceleration, and calculates a lateral acceleration difference, which is an absolute value of a difference between the second lateral acceleration and the first lateral acceleration.

The processing unit performs the occupant determination based on the occupant determination threshold value when the lateral acceleration difference is smaller than the lateral acceleration difference threshold value, and does not perform the occupant determination when the lateral acceleration difference is larger than the lateral acceleration difference threshold value.

According to an aspect of an embodiment of the present application, the storage unit further stores a process resumption threshold value. The processing unit causes the process resumption threshold value and a flag, which indicates that the occupant determination is not performed when the lateral acceleration difference is larger than the lateral acceleration difference threshold value, to be stored in the storage unit. The processing unit does not perform the occupant determination when the flag is present and until the weight passes through the process resumption threshold value.

According to an aspect of an embodiment of the present application, the process resumption threshold value is equal to the first load threshold value.

An occupant determination method according to an aspect of an embodiment of the present application includes calculating a weight of an object on a seat of a vehicle using a weight sensor, calculating lateral acceleration, which is acceleration in a width direction of the vehicle, using a lateral acceleration sensor, setting the lateral acceleration at a time when the weight passes through a first load threshold value, which is stored in a storage unit, as first lateral acceleration, setting the lateral acceleration at a time when the weight passes through a second load threshold value, which is stored in the storage unit, as second lateral acceleration, calculating a lateral acceleration difference, which is an absolute value of a difference between the second lateral acceleration and the first lateral acceleration, and deciding whether or not to perform the occupant determination so that the occupant determination is performed when the lateral acceleration difference is smaller than a lateral acceleration difference threshold value stored in the storage unit, or the occupant determination is not performed when the lateral acceleration difference is larger than the lateral acceleration difference threshold value.

BRIEF DESCRIPTION OF THE DRAWINGS

The advantages of the disclosure will become apparent in the following description taken in conjunction with the following drawings.

DETAILED DESCRIPTION

An embodiment of the present application is described below with reference to the drawings.

In the description below, a direction in which a vehicle advances corresponds to a forward direction and a leftward or rightward direction corresponds to a width direction of the vehicle, which is a lateral direction with respect to the direction in which the vehicle advances.

Figure 1:
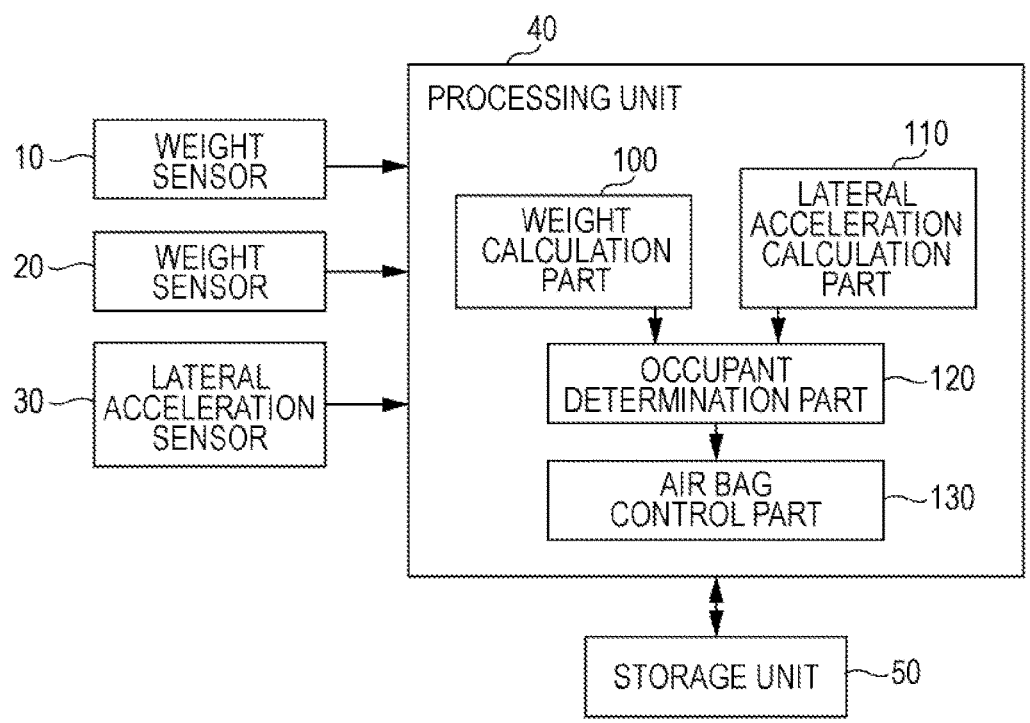
FIG. 1 is a block diagram that illustrates a structure including an occupant determination apparatus according to an embodiment of the present application.

FIG. 1 is a block diagram that illustrates a structure including an occupant determination apparatus according to the embodiment of the present application.

The occupant determination apparatus includes a weight sensor 10, a weight sensor 20, a lateral acceleration sensor 30, a processing unit 40, and a storage unit 50.

The weight sensors 10 and 20 sense a load on a seat provided to the vehicle.

Figure 2:
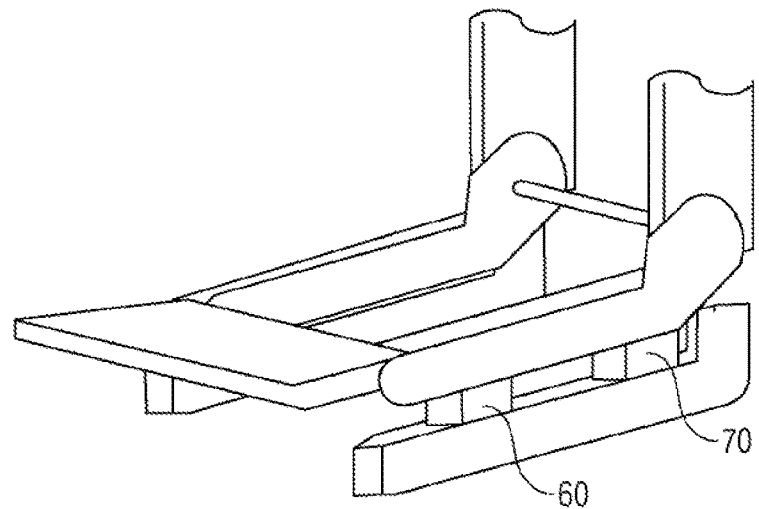
FIG. 2 is a schematic diagram that illustrates positions of weight sensors in a seat.

FIG. 2 is a schematic diagram that illustrates positions of the weight sensors 10 and 20.

The weight sensors 10 and 20 are arranged at two positions of slide adjustment mechanisms 60 and 70 located on the left side of the seat. On the right side of the seat, no weight sensors are arranged. The weight sensor 10 is arranged on the front side of the seat and the weight sensor 20 is arranged on the rear side of the seat. Thus, the number of weight sensors may be reduced while simplifying the structure although a typical structure needs two weight sensors each for both the left side and the right side.

The weight sensors 10 and 20 directly receive the load of the seat with sensors and sense the load with a strain gauge in a lower portion of a strain body. The weight sensors 10 and 20 measure the weight on the seat.

The lateral acceleration sensor 30 senses lateral acceleration, which is acceleration in the width direction of the vehicle. The lateral acceleration sensor 30 is equipped at a predetermined position fixed to the vehicle in a lower portion of the vehicle, which is for example, on the underside of the seat.

The storage unit 50 may be given non-volatile memory, such as semiconductor memory or a hard disc drive (HDD), or may be a combination of non-volatile memory and volatile memory. The storage unit 50 stores each threshold value, which is described below, work data that the processing unit 40 generates or refers to in accordance with operations thereof, and the like.

The processing unit 40 is a computer with a processor, such as a central processing unit (CPU), and memory, such as read only memory (ROM) in which a program is written, or random access memory (RAM) for temporarily storing data, and includes a weight calculation part 100, a lateral acceleration calculation part 110, an occupant determination part 120, and an air bag control part 130.

Each of the above-described parts included in the processing unit 40 may be implemented by the processing unit 40, which is a computer, executing a program, and the computer program may be stored in a given computer-readable storage medium.

Each of the above-described parts included in the processing unit 40 may be implemented by executing a program or may be configured as special-purpose hardware that includes one or more electrical components, or may be configured by a hardware such as circuitry.

The weight calculation part 100 calculates the weight on the seat based on information from the two weight sensors 10 and 20.

The lateral acceleration calculation part 110 calculates lateral acceleration based on information from the lateral acceleration sensor 30. The lateral acceleration may be indicated as a value that has a positive or negative sign, that is, a plus or minus sign.

The occupant determination part 120 performs determination of an occupant on the seat based on the weight on the seat calculated by the weight calculation part 100, the lateral acceleration calculated by the lateral acceleration calculation part 110, and various kinds of data stored in the storage unit 50. The occupant determination part 120 transmits the occupant determination result to the air bag control part 130.

The air bag control part 130 controls an air bag equipped in the vehicle based on the occupant determination result.

The occupant determination is now described.

First, an example of typical occupant determination is described for comparison.

Figure 3:
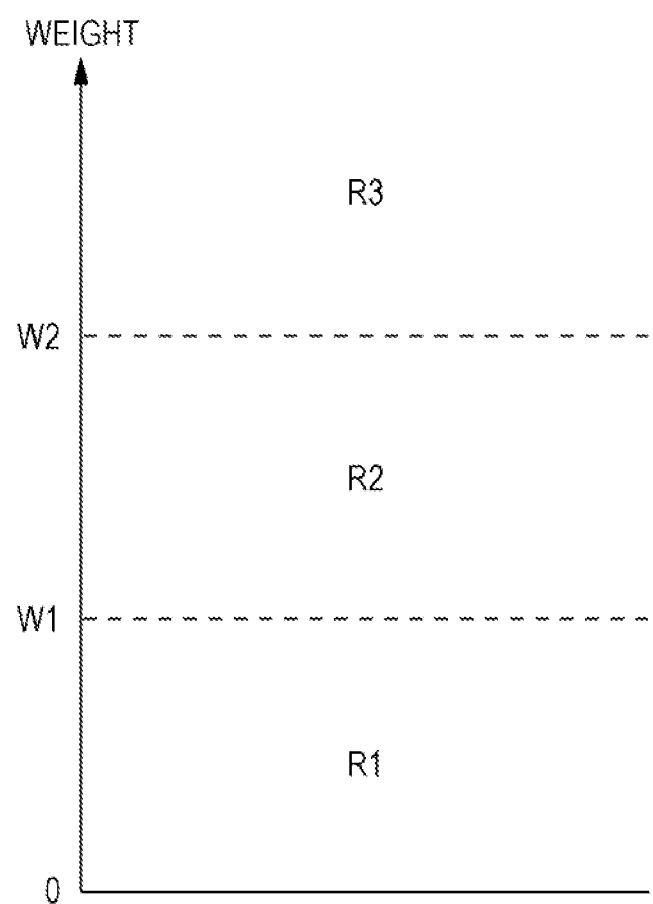
FIG. 3 is a diagram that illustrates a typical relation between a weight and occupant determination.

FIG. 3 is a diagram that illustrates a typical relation between a weight and occupant determination.

In the typical occupant determination, classification is performed based on a measured weight into three regions, which are regions R1, R2, and R3.

The region R1 under an occupant determination threshold value W1 indicates a vacant seat.

The region R2 between the occupant determination threshold value W1 and an occupant determination threshold value W2 indicates a child car seat. The child car seat is called a supplemental system for a child or a child restraint system (CRS). That is, the region R2 indicates a state in which a child is sitting on the seat.

The region R3 over the occupant determination threshold value W2 indicates a state in which an adult is sitting on the seat.

In a typical system, in which simple occupant determination is performed, the weight calculated based on a lapse of predetermined time is compared with the occupant determination threshold values W1 and W2 and it is determined whether the seat is vacant, or is used with the CRS or by an adult.

However, when the vehicle runs along a curving road while cornering, the vehicle receives lateral acceleration. When the vehicle receives lateral acceleration, the weight of the occupant no longer acts equally toward the side on which the weight sensors 10 and 20 are equipped and toward the side on which the weight sensors 10 and 20 are not equipped because the weight sensors 10 and 20 are equipped on the left side of the seat.

Figure 4:
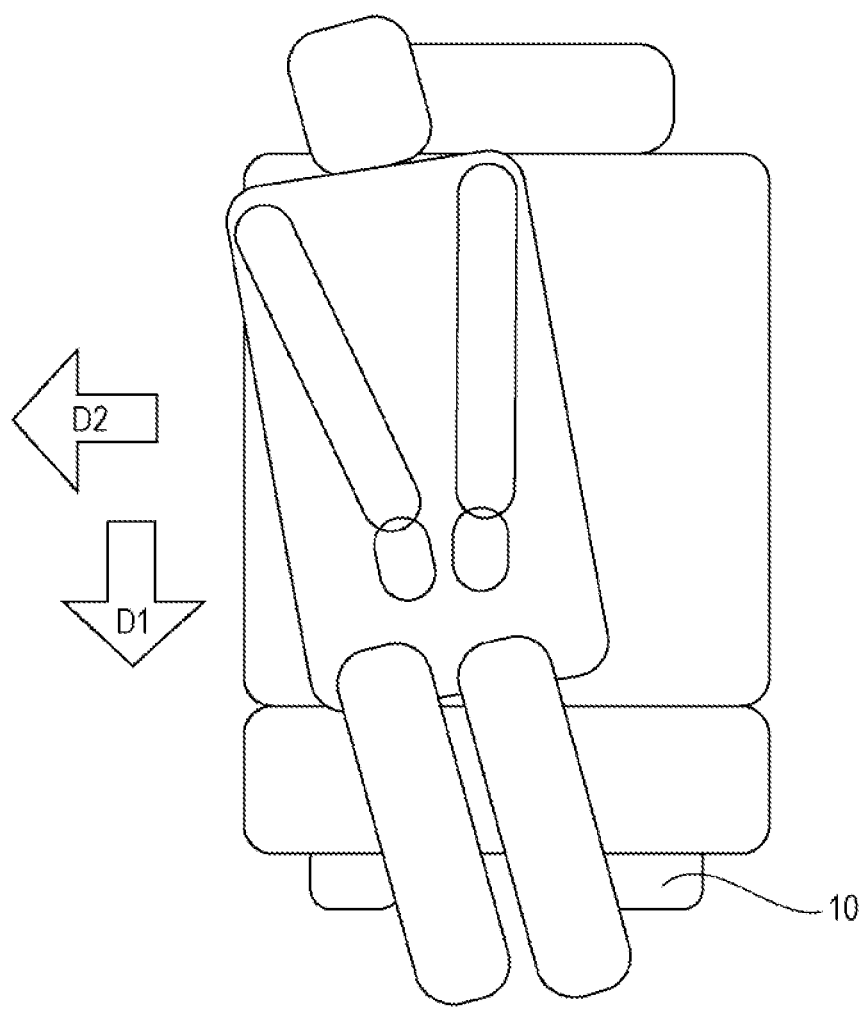
FIG. 4 is a schematic diagram that illustrates a case in which lateral acceleration acts toward the side on which the weight sensors are not equipped.

FIG. 4 is a schematic diagram that illustrates a case in which lateral acceleration acts toward the side on which the weight sensors 10 and 20 are not equipped.

When the vehicle receives lateral acceleration in the rightward direction, force is applied to the occupant in the direction of gravity, which an arrow with characters "D1" points, and in the rightward direction of the lateral acceleration, which an arrow with characters "D2" points. In this case, the weight of the occupant shifts toward the side on which the weight sensors 10 and 20 are not equipped and the weight sensors 10 and 20 sense a weight lighter than the actual weight.

Figure 5:
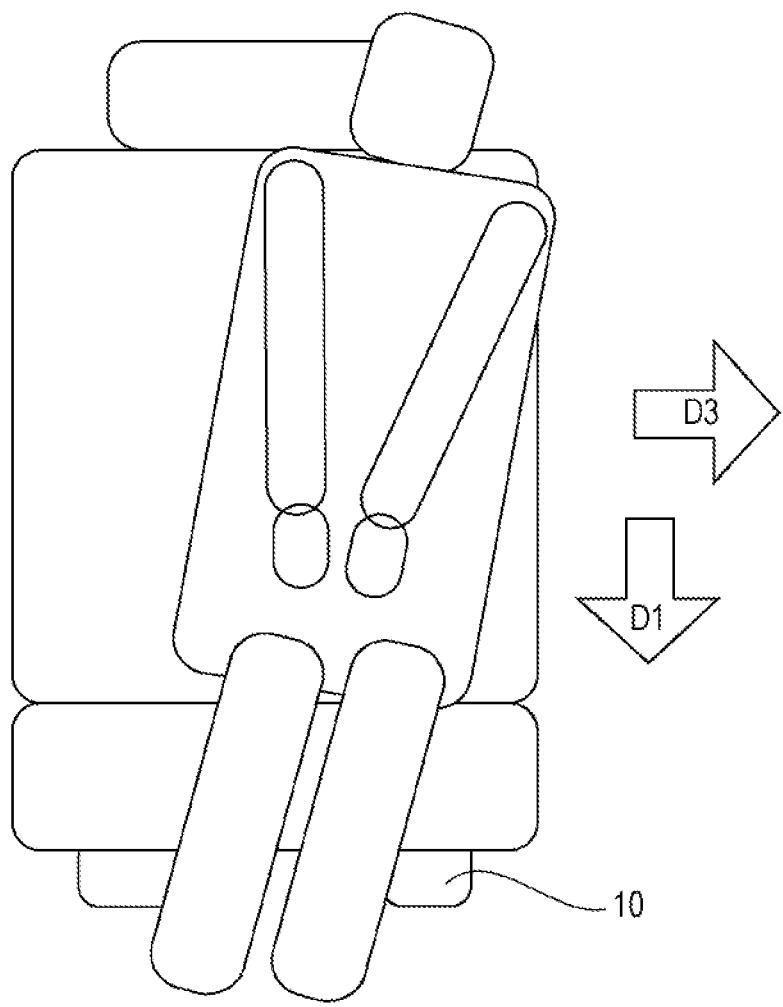
FIG. 5 is a schematic diagram that illustrates a case in which lateral acceleration acts toward the side on which the weight sensors are equipped.

FIG. 5 is a schematic diagram that illustrates a case in which lateral acceleration acts toward the side on which the weight sensors 10 and 20 are equipped.

When the vehicle receives the lateral acceleration in the leftward direction, force is applied to the occupant in the direction of gravity, which the arrow with characters "D1" points, and in the leftward direction of the lateral acceleration, which an arrow with characters "D3" points. In this case, the weight of the occupant shifts toward the side on which the weight sensors 10 and 20 are equipped and the weight sensors 10 and 20 sense a weight heavier than the actual weight.

Thus, when the vehicle receives acceleration in the lateral direction, the occupant determination may result in the loss of accuracy.

The present applicant examined how the weight and the lateral acceleration vary as time elapses when the vehicle runs while occasionally cornering with the weight sensors 10 and 20 equipped only on one side of the seat as in the present embodiment.

Figure 6:
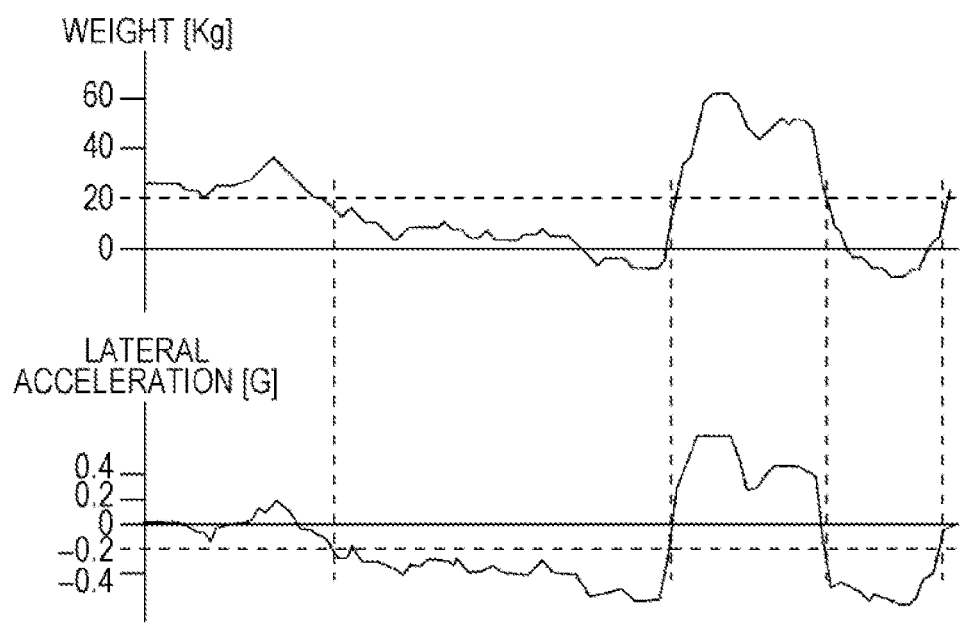
FIG. 6 is a diagram that illustrates an example of a relation between a weight and the lateral acceleration, which vary as time elapses, in a case in which a vehicle runs with occasional cornering.

FIG. 6 is a diagram that illustrates an example of a relation between the weight and the lateral acceleration, which vary as time elapses, in a case in which the vehicle runs while occasionally cornering.

As illustrated in FIG. 6, the waveforms of the weight and the lateral acceleration based on the lapse of time are similar to each other. The present applicant noticed the similarity and graphed the relation between the lateral acceleration and the weight.

Figure 7:
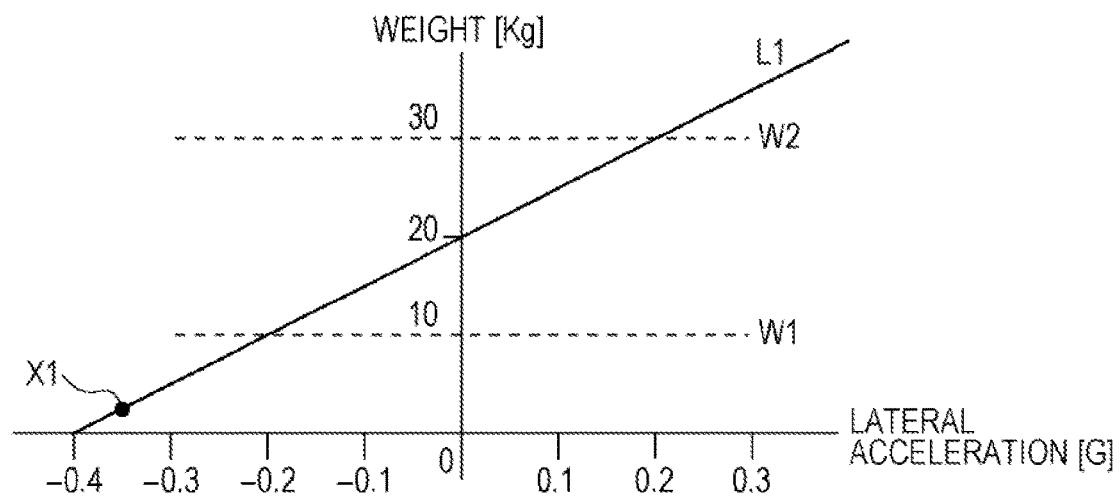
FIG. 7 is a diagram that illustrates a relation between the lateral acceleration and the weight in a case in which the vehicle runs with occasional cornering and an occupant uses a child restraint system (CRS)

FIG. 7 is a diagram that illustrates a relation between the lateral acceleration and the weight in a case in which the vehicle runs while occasionally cornering and the occupant uses the CRS.

In FIG. 7, the plus side of the lateral acceleration indicates a state in which the vehicle receives lateral acceleration in the leftward direction and the occupant moves in the direction toward the left on which the weight sensors 10 and 20 are equipped. The minus side of the lateral acceleration in FIG. 7 indicates a state in which the vehicle receives lateral acceleration in the rightward direction and the occupant moves in the direction toward the right on which the weight sensors 10 and 20 are not equipped. FIG. 7 demonstrates that the relation between the lateral acceleration and the weight forms a proportional straight line such as line L1, which seems to be a linear function.

Thus, if the occupant determination is performed by merely comparing the weight with the occupant determination threshold values W1 and W2 without taking the lateral acceleration into account, the determination may be unstable and cause a not perfect result.

An error of the lateral acceleration sensor 30 may also affect the occupant determination.

The lateral acceleration sensor 30 may involve an offset error and a sensitivity error.

The offset indicates an output at the time of 0 G. The offset error indicates a deviation at the time when the lateral acceleration sensor 30 is at an offset position.

The sensitivity is defined as an inclination of the straight line that connects two points based on outputs at the times of, for example, −1 G and +1 G. The sensitivity error is an error of the inclination.

The lateral acceleration sensor 30 that is normally used may involve an error of approximately ±0.05 G (25%) when the offset error indicates ±0.15 G and the sensitivity error indicates 0.2 G.

When the offset error and the sensitivity error are compared with each other near 0 G used in the present embodiment, generally, the offset error affects the lateral acceleration sensor 30 more than the sensitivity error does.

Since the lateral acceleration sensor 30 may involve such errors as described above, deciding whether or not to perform the occupant determination only by referring to the value of the lateral acceleration sensor 30 may lead to a not perfect result.

Besides, since the lateral acceleration sensor 30 may involve the offset error, which would not be negligible, determining not to perform the occupant determination simply when the lateral acceleration is equal to or larger than a predetermined value may cause a not perfect result of the occupant determination.

Suppose when the lateral acceleration sensor 30 with the offset error of +0.15 G is used as an example and the lateral acceleration measures −0.2 G, the actual lateral acceleration amounts to −0.35 G because of the offset error of 0.15 G as illustrated as a point X1 in FIG. 7, and the measured value of the weight indicates 2.5 kg. The value is smaller than the occupant determination threshold value W1 of 10 kg and incorrect occupant determination is caused. The lateral acceleration of −0.35 G substantially corresponds to the range in which no occupant determination is desired to be performed and thus, is not included in the range in which the occupant determination is desired to be maintained.

It is thus desirable to reduce influences exerted by the offset error of the lateral acceleration sensor 30 and to increase the accuracy of the occupant determination.

In the present embodiment, such influences of the offset error are suppressed by measuring the variation amount of the lateral acceleration in view of the sensitivity error of the lateral acceleration sensor 30, which is small at a low lateral acceleration near 0 G. As a result of excluding the influences of the offset error, the occupant determination is not affected much because the sensitivity error is small.

Without the sensitivity error of the lateral acceleration, the variation amount of the weight on the seat and the variation amount of the lateral acceleration are related proportionally and correspond to each other. Accordingly, when the variation amount of the weight is equal to or larger than a predetermined value, the variation amount of the lateral acceleration is also equal to or larger than a predetermined value. When the variation amount of the lateral acceleration is large enough to enable the offset error of the lateral acceleration sensor 30 to exert some influences, no new occupant determination is performed and the result of the previous occupant determination is maintained.

Figure 8:
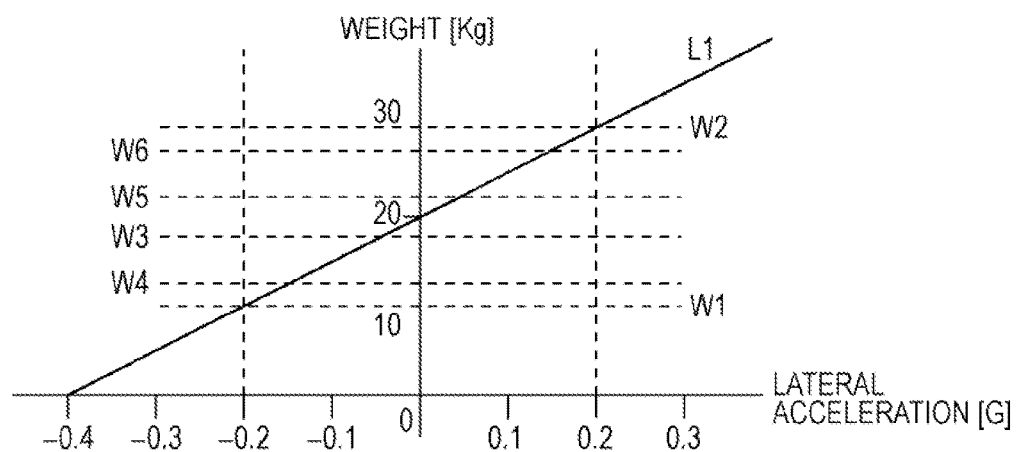
FIG. 8 is a diagram that illustrates a relation between the lateral acceleration and the weight and various threshold values in a case in which the vehicle runs with occasional cornering and the occupant uses the CRS.

FIG. 8 is a diagram that illustrates a relation between the lateral acceleration and the weight and various threshold values in a case in which the vehicle runs while occasionally cornering and the occupant uses the CRS.

To specify the variation amount of the weight, which corresponds to the variation amount of the lateral acceleration, a first load threshold value W3 and a second load threshold value W4 are set. Further, a lateral acceleration difference threshold value D1 is set, which is the predetermined value of the variation amount of the lateral acceleration.

When the calculated weight passes through the first load threshold value W3 as a result of being affected by the lateral acceleration and further passes through the second load threshold value W4, and when the variation amount of the lateral acceleration is larger than the lateral acceleration difference threshold value D1, no new occupant determination is performed and the result of the previous occupant determination is maintained.

The variation amount of the lateral acceleration may be obtained by calculating a difference between the lateral acceleration at the time when the calculated weight passes through the first load threshold value W3 and the lateral acceleration at the time when the calculated weight passes through the second load threshold value W4.

After having passed through the first load threshold value W3, the calculated weight may return to a state before the passage through the first load threshold value W3 without further passing through the second load threshold value W4. The return is described with reference to FIG. 9.

Figure 9:
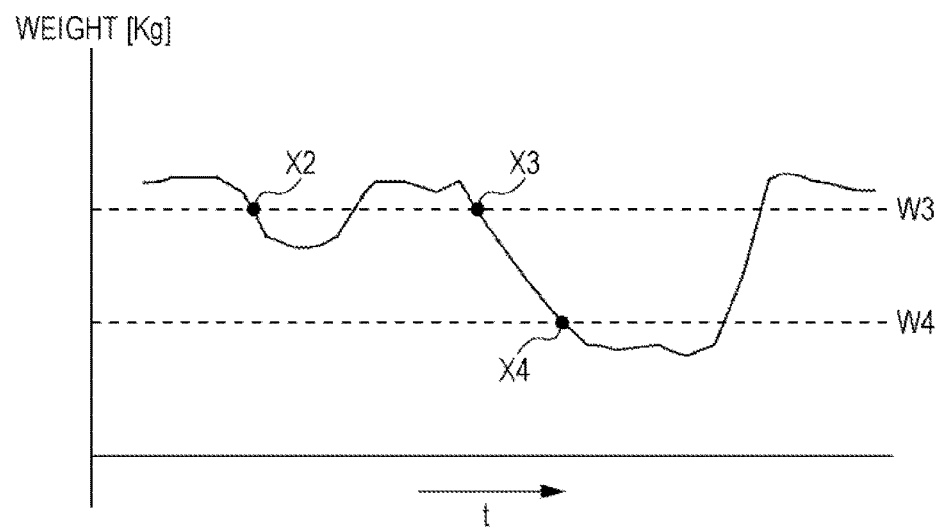
FIG. 9 is a timing chart that illustrates an example of a relation between the weight that varies as time elapses and a lateral acceleration difference subjected to comparison.

FIG. 9 is a timing chart that illustrates an example of a relation between the weight that varies as time elapses and the lateral acceleration difference subjected to comparison.

In the example illustrated in FIG. 9, the calculated weight passes through the first load threshold value W3 at a measurement point X2 and then returns to the state before the passage through the first load threshold value W3 without passing through the second load threshold value W4 while time t elapses. After that, the calculated weight passes through the first load threshold value W3 again at a measurement point X3 and passes through the second load threshold value W4 at a measurement point X4.

In this case, the difference between the lateral acceleration at the measurement point X3 and the lateral acceleration at the measurement point X4 is used as the lateral acceleration difference subjected to comparison instead of the difference between the lateral acceleration at the measurement point X2 and the lateral acceleration at the measurement point X4. That is, the lateral acceleration in the case in which the calculated weight passes through the first load threshold value W3 immediately before passing through the second load threshold value W4 is used.

As described above, the use of the latest lateral acceleration at the measurement point X3 at which the calculated weight passes through the first load threshold value W3 ensures the continuity of the lateral acceleration. Accordingly, a case in which the occupant is merely swayed without receiving any lateral acceleration and the calculated weight happens to pass through the first load threshold value W3 may be excluded.

Since the lateral acceleration acts in the leftward direction or the rightward direction, as illustrated in FIG. 8, a first load threshold value W5 is set as the first load threshold value in addition to the first load threshold value W3 so as to be adapted to displacement of the lateral acceleration in the opposite direction. Similarly, a second load threshold value W6 is set as the second load threshold value in addition to the second load threshold value W4.

Each of the first load threshold values W3 and W5 and the second load threshold values W4 and W6 is set to a value between the occupant determination threshold value W1 and the occupant determination threshold value W2. Each of the first load threshold values W3 and W5 may be set to a central value of the weight region R2 corresponding to the CRS.

As an example, the storage unit 50 is caused to store the first load threshold value W3 set to 20 kg, the second load threshold value W4 set to 18 kg, and the lateral acceleration difference threshold value D1 set to 0.05 G in advance.

Processing operations of the occupant determination part 120 are performed as described below.

The processing operations of the occupant determination part 120 are described separately as process 1 and process 2.

Figure 10:
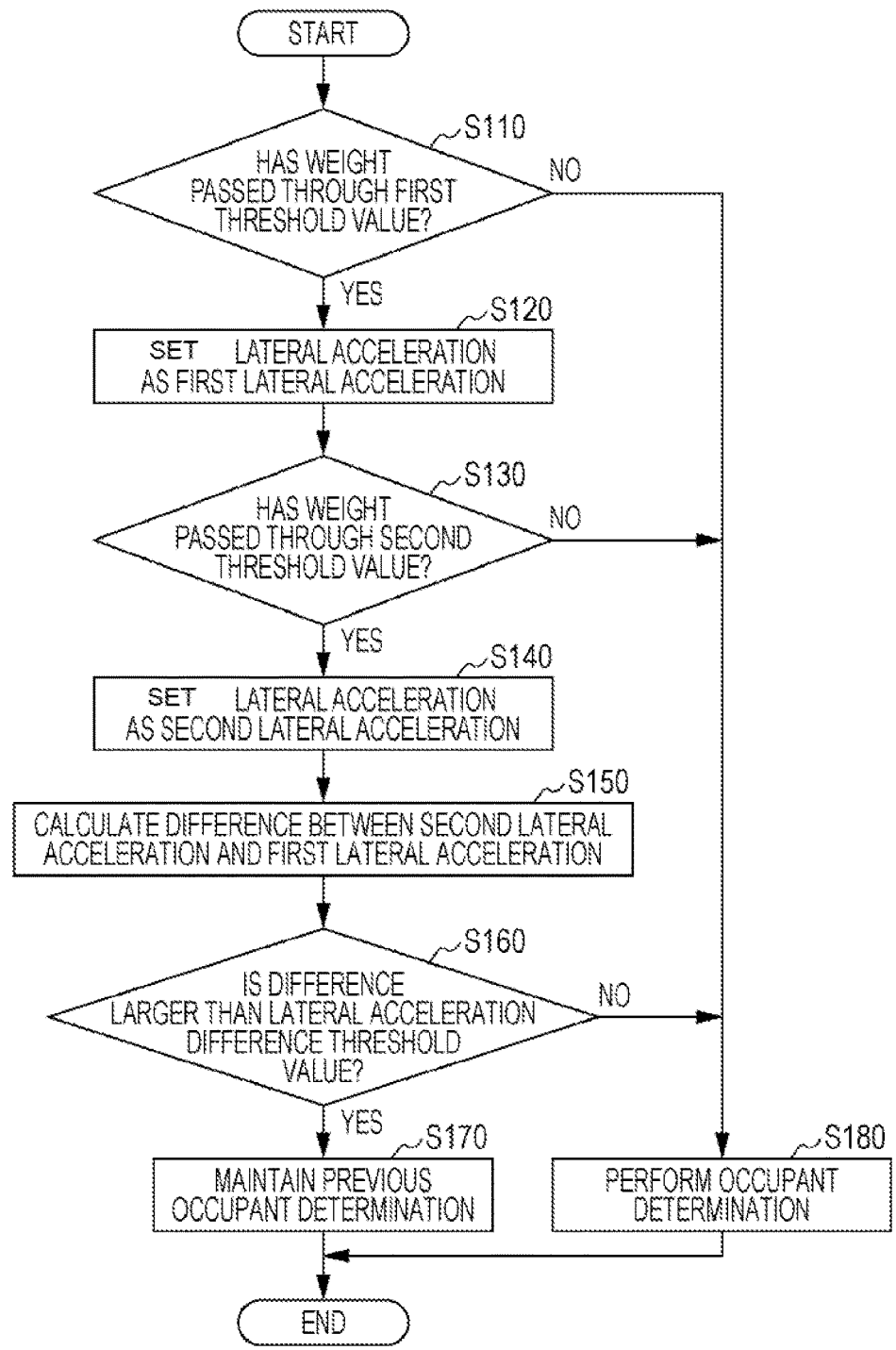
FIG. 10 is a flow chart that illustrates an operational procedure of process 1 of an occupant determination part.

FIG. 10 is a flow chart that illustrates an operational procedure of process 1 of the occupant determination part 120.

In an example in the description below, the lateral acceleration shifts from the plus side to the minus side.

The first load threshold values W3 and W5, the second load threshold values W4 and W6, and the lateral acceleration difference threshold value D1 are stored in the storage unit 50 in advance.

In step S110, it is determined whether the calculated weight has passed through the first load threshold value W3. Even when the calculated weight passes through the first load threshold value W3 and then returns to the state before the passage through the first load threshold value W3, and after that, passes through the first load threshold value W3 again, the determination is performed similarly.

When it is determined that the calculated weight has passed through the first load threshold value W3, the process proceeds to step S120. Otherwise, the process proceeds to step S180.

In step S120, the lateral acceleration is defined as a first lateral acceleration G1 and stored in the storage unit 50. Accordingly, the latest first lateral acceleration G1 is stored in the storage unit 50. After that, the process proceeds to step S130.

In step S130, it is determined whether the calculated weight has passed through the second load threshold value W4.

When it is determined that the calculated weight has passed through the second load threshold value W4, the process proceeds to step S140.

Otherwise, the process proceeds to step S180.

In step S140, the lateral acceleration at the time is defined as a second lateral acceleration G2 and stored in the storage unit 50. After that, the process proceeds to step S150.

In step S150, a difference between the second lateral acceleration G2 and the first lateral acceleration G1 is obtained and an acceleration difference G3 of an absolute value is calculated. After that, the process proceeds to step S160.

In step S160, it is determined whether the calculated acceleration difference G3 is larger than the lateral acceleration difference threshold value D1. The lateral acceleration difference threshold value D1 is stored in the storage unit 50 in advance.

When the calculated acceleration difference G3 is larger than the lateral acceleration difference threshold value D1, the process proceeds to step S170.

When the calculated acceleration difference G3 is smaller than the lateral acceleration difference threshold value D1, the process proceeds to step S180.

In step S170, no occupant determination is performed. As a result, the previous occupant determination is maintained. That is, the occupant determination result stored in the storage unit 50 is not updated.

Thus, the air bag control part 130 performs air bag control based on the previous occupant determination result stored in the storage unit 50.

When the occupant determination is maintained, a flag indicating that the previous occupant determination is maintained, which is hereinafter referred to as the "being-maintained-flag," is stored in the storage unit 50. After that, the process ends.

In step S180, new occupant determination is performed. That is, the calculated weight is compared with the occupant determination threshold values W1 and W2 to determine whether the occupant is an adult or uses the CRS, or the seat is vacant.

The occupant determination part 120 causes the occupant determination result to be stored in the storage unit 50. Then, the process ends.

When the lateral acceleration shifts from the minus side to the plus side, the first load threshold value W3 is replaced with the first load threshold value W5, and the second load threshold value W4 is replaced with the second load threshold value W6. The process performed in this case is similar to the above-described process.

Process 2 of the occupant determination is now described. Process 2 is performed so as to resume the occupant determination after having maintained the previous occupant determination.

Figure 11:
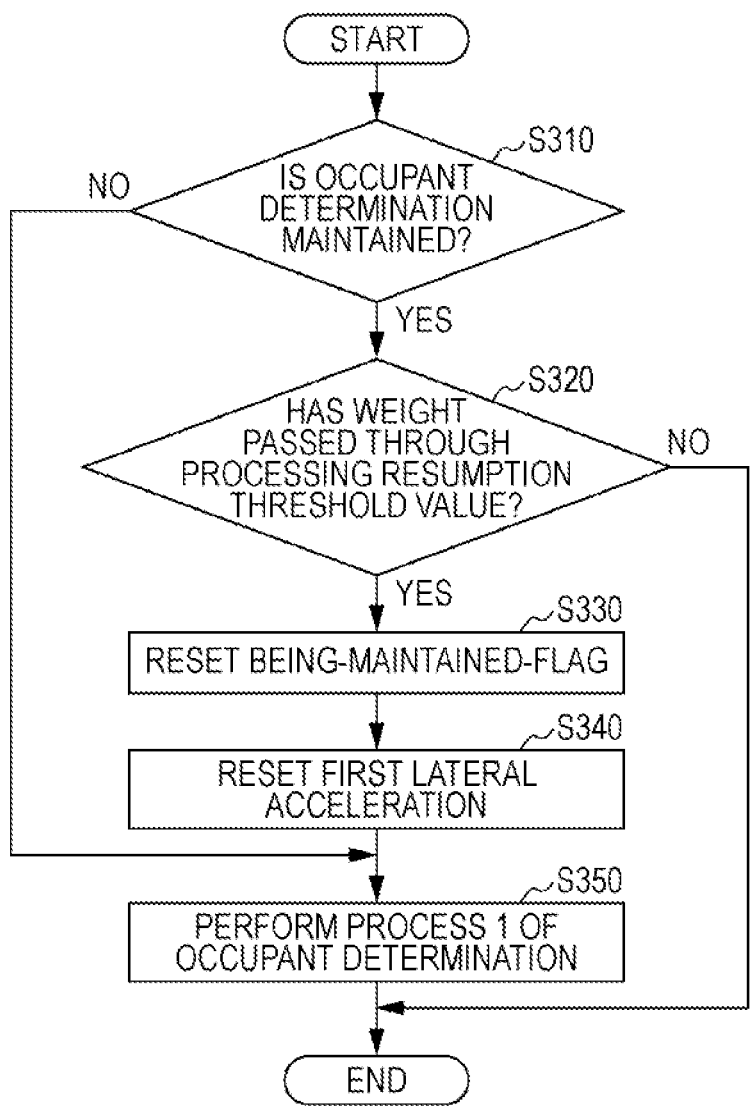
FIG. 11 is a flow chart that illustrates an operational procedure of process 2 of the occupant determination part.

FIG. 11 is a flow chart that illustrates an operational procedure of process 2 of the occupant determination part 120.

In step S310, it is determined whether the occupant determination is maintained. The determination is performed based on whether or not the being-maintained-flag is stored in the storage unit 50. When the occupant determination is maintained, the process proceeds to step 320.

When the occupant determination is not maintained, the process proceeds to step S350.

In step S320, it is determined whether the calculated weight has passed through a process resumption threshold value W7. The process resumption threshold value W7 is a value between the occupant determination threshold value W1 and the occupant determination threshold value W2, and is stored in the storage unit 50 in advance. The process resumption threshold value W7 may be equal to the occupant determination threshold value W3 or when the CRS is used, may be equal to a median value of the region.

When the calculated weight passes through the process resumption threshold value W7, the process proceeds to step S330.

Otherwise, the previous occupant determination result is maintained. After that, the process ends.

In step S330, the being-maintained-flag is reset. Then, the process proceeds to step S340.

In step S340, the first lateral acceleration G1 is reset.

In step S350, the occupant determination is resumed. That is, process 1 of the occupant determination described above is performed.

After that, the process ends.

As described above, when the occupant determination part 120 halts the occupant determination, the occupant determination is not resumed until the weight returns to the state in which the weight passes through the process resumption threshold value W7. When the weight shifts in the direction opposite the direction in which the weight passes through the first load threshold value W3 or W5, and returns to the state in which the weight passes through the process resumption threshold value W7, the occupant determination is resumed.

Thus, the offset error of the lateral acceleration sensor 30 may be prevented from affecting the occupant determination and incorrect occupant determination may be inhibited.

In determining whether or not the weight has passed through the threshold value, such as the first load threshold value W3 or W5, in step S110 or the like, the weight shift is occurring in one of two directions depending on the direction of the lateral acceleration, that is, from the light state to the heavy state or from the heavy state to the light state.

The direction of the weight shift may be determined by causing the calculated weight to be stored in the storage unit 50 each time and comparing the currently-calculated weight with the previously-calculated weight.

In regard to the being-maintained-flag, the direction may be determined by referring to the being-maintained-flag in the direction in which the weight shifts from the heavy state to the light state as F1 and referring to the being-maintained-flag in the direction in which the weight shifts from the light state to the heavy state as F2 to distinguish the being-maintained-flags.

Although in the above-described embodiment, the weight sensors 10 and 20 are equipped on the left side of the seat, equipping the weight sensors 10 and 20 on the right side makes no difference and the left-right relation is merely reversed.

Thus, the present embodiment is applicable similarly even when the weight sensors 10 and 20 are equipped on the right side.

As described above, the occupant determination apparatus according to the present embodiment includes the weight sensors 10 and 20 that sense a weight on a seat of a vehicle, the lateral acceleration sensor 30 that senses lateral acceleration, which is acceleration in the width direction of the vehicle, the storage unit 50 that stores the occupant determination threshold values W1 and W2 for occupant determination, the first load threshold values W3 and W5, the second load threshold values W4 and W6, and the lateral acceleration difference threshold value D1, and the processing unit 40 that performs operations of the occupant determination.

The processing unit 40 defines the lateral acceleration in a case in which the weight passes through the first load threshold value W3 or W5 as the first lateral acceleration G1, defines the lateral acceleration in a case in which the weight passes through the second load threshold value W4 or W6 as the second lateral acceleration G2, and calculates a lateral acceleration difference, which is an absolute value of a difference between the second lateral acceleration G2 and the first lateral acceleration G1.

The processing unit 40 performs the occupant determination based on the occupant determination threshold values W1 and W2 when the lateral acceleration difference is smaller than the lateral acceleration difference threshold value D1, or does not perform the occupant determination when the lateral acceleration difference is larger than the lateral acceleration difference threshold value D1.

According to the present embodiment, incorrect occupant determination may be inhibited, which is caused by for example, performing the occupant determination even though the weight has not reached a preset value because of tolerance of the lateral acceleration sensor 30.

Incorrect occupant determination may be inhibited by maintaining the previous occupant determination result when the lateral acceleration difference is larger than the lateral acceleration difference threshold value D1.

In addition, a process of measuring the offset error of the lateral acceleration sensor 30 in advance and making a cancellation at the beginning may become unnecessary.

Embodiments of the present application are not limited to the embodiment described above and various changes may be added within the scope of the present disclosure. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A determination apparatus for occupant comprising:
    a weight sensor that senses a weight of an object on a seat of a vehicle;
    a lateral acceleration sensor that senses lateral acceleration, the lateral acceleration being acceleration of the vehicle in a width direction of the vehicle;
    a storage unit that stores an occupant determination threshold value for occupant determination, a first load threshold value, a second load threshold value, a lateral acceleration difference threshold value, and an occupant determination result; and
    a processing unit that determines whether a flag is set or reset in the storage unit, and if the flag is reset in the storage unit, performs an occupant determination operation in which the processing unit:
        determining the lateral acceleration at a time when the weight passes through the first load threshold value as first lateral acceleration,
        determining the lateral acceleration at a time when the weight passes through the second load threshold value as second lateral acceleration,
        calculating a lateral acceleration difference that is an absolute value of a difference between the second lateral acceleration and the first lateral acceleration,
        performing the occupant determination based on the occupant determination threshold value and updating the occupant determination result stored in the storage unit only if the lateral acceleration difference is smaller than the lateral acceleration difference threshold value,
    wherein the second load threshold value is smaller than the first load threshold value, the time when the weight passes through the first load threshold value is a time when the weight passes through the first load threshold value with the weight decreasing from a value higher than the first load threshold value to a value lower than the first load threshold value, and the time when the weight passes through the second load threshold value is a time when the weight passes through the second load threshold value with the weight decreasing from a value higher than the second load threshold value,
    wherein the storage unit further stores a process resumption threshold value, the process resumption threshold value is larger than the second threshold value,
    the processing unit sets the flag in the storage unit when the lateral acceleration difference is larger than or equal to the lateral acceleration difference threshold value to indicate that the occupant determination result stored in the storage unit is not updated and is maintained, and
    the processing unit resets the flag when the weight increases and passes through the process resumption threshold value after setting the flag such that the occupant determination operation is enabled to be started,
    wherein the processing unit controls an airbag of the vehicle in accordance with the occupant determination result stored in the storage unit so as to control the airbag in accordance with the updated occupant determination result when the lateral acceleration difference is smaller than the lateral acceleration difference threshold value and control the airbag in accordance with the maintained occupant determination result when the lateral acceleration difference is larger than or equal to the lateral acceleration difference threshold value.

2. The determination apparatus according to claim 1, wherein the process resumption threshold value is equal to the first load threshold value.

3. A determination method for occupant comprising:
    calculating a weight of an object on a seat of a vehicle using a weight sensor;
    determining whether a flag is set or reset in a storage device, and if the flag is reset in the storage device, performing an occupant determination processing;
    wherein the occupant determination processing comprises:
        calculating lateral acceleration using a lateral acceleration sensor, the lateral acceleration being acceleration of the vehicle in a width direction of the vehicle;
        determining the lateral acceleration at a time when the weight passes through a first load threshold value as first lateral acceleration, the first load threshold value being stored in a storage unit;
        determining the lateral acceleration at a time when the weight passes through a second load threshold value as second lateral acceleration, the second load threshold value being stored in the storage unit;
        calculating a lateral acceleration difference that is an absolute value of a difference between the second lateral acceleration and the first lateral acceleration;
        performing an occupant determination based on an occupant determination threshold value stored in the storage device and updating an occupant determination result stored in the storage device only if the lateral acceleration difference is smaller than the lateral acceleration difference threshold value
        setting a flag in the storage unit when the lateral acceleration difference is larger than or equal to the lateral acceleration difference threshold value to indicate that the occupant determination result stored in the storage device is not updated and is maintained,
    wherein the second load threshold value is smaller than the first load threshold value, the time when the weight passes through the first load threshold value is a time when the weight passes through the first load threshold value with the weight decreasing from a value higher than the first load threshold value to a value lower than the first load threshold value, and the time when the weight passes through the second load threshold value is a time when the weight passes through the second load threshold value with the weight decreasing from a value higher than the second load threshold value;
    resetting the flag when the weight increases and passes through a process resumption threshold value stored in the storage device after setting the flag such that the occupant determination operation is enabled to be started, the process resumption threshold value being larger than the second threshold value; and controlling an airbag of the vehicle in accordance with the occupant determination result stored in the storage device so as to control the airbag in accordance with the updated occupant determination result when the lateral acceleration difference is smaller than the lateral acceleration difference threshold value and control the airbag in accordance with the maintained occupant determination result when the lateral acceleration difference is larger than or equal to the lateral acceleration difference threshold value.

4. The determination apparatus according to claim 1, wherein the process resumption threshold value is a value between the first load threshold value and the second load threshold value.

5. The determination apparatus for occupant according to claim 1, wherein when the weight passes through the first load threshold value multiple times with the weight decreasing from the value higher than the first load threshold value to the value lower than the first load threshold value before the weight passes through the second load threshold value, the processing unit calculates the lateral acceleration difference by using the first lateral acceleration obtained at the latest time the weight passes through the first load threshold value before passing through the second load threshold value.

6. The determination apparatus for occupant according to claim 1, wherein the occupant determination determines a type of the occupant.

7. The determination apparatus for occupant according to claim 1, wherein the weight sensor is disposed only on the right side of the seat or the left side of the seat.

8. A vehicle comprising the determination apparatus for occupant according to claim 1.

9. A determination apparatus for occupant comprising:
a weight sensor that senses a weight of an object on a seat of a vehicle;
a lateral acceleration sensor that senses lateral acceleration, the lateral acceleration being acceleration of the vehicle in a width direction of the vehicle;
a storage device that stores an occupant determination threshold value for occupant determination, a first load threshold value, a second load threshold value, a lateral acceleration difference threshold value, and an occupant determination result; and
a computer that determines whether a flag is set or reset in the storage device, and if the flag is reset in the storage device, performs an occupant determination operation in which the computer:
obtaining the lateral acceleration value at a time when the weight passes through the first load threshold value and setting the obtained lateral acceleration value as first lateral acceleration,
obtaining the lateral acceleration value at a time when the weight passes through the second load threshold value and setting the obtained lateral acceleration value as second lateral acceleration,
calculating a lateral acceleration difference that is an absolute value of a difference between the second lateral acceleration and the first lateral acceleration,
performing the occupant determination based on the occupant determination threshold value and updating the occupant determination result stored in the storage unit only if the lateral acceleration difference is smaller than the lateral acceleration difference threshold value,
wherein the second load threshold value is smaller than the first load threshold value, the time when the weight passes through the first load threshold value is a time when the weight passes through the first load threshold value with the weight decreasing from a value higher than the first load threshold value to a value lower than the first load threshold value, and the time when the weight passes through the second load threshold value is a time when the weight passes through the second load threshold value with the weight decreasing from a value higher than the second load threshold value,
wherein the storage device further stores a process resumption threshold value, the process resumption threshold value is larger than the second threshold value,
the computer sets the flag in the storage device when the lateral acceleration difference is larger than or equal to the lateral acceleration difference threshold value to indicate that the occupant determination result stored in the storage unit is not updated and is maintained, and
the computer resets the flag when the weight increases and passes through the process resumption threshold value after setting the flag such that the occupant determination operation is enabled to be started,
wherein the computer controls an airbag of the vehicle in accordance with the occupant determination result stored in the storage unit so as to control the airbag in accordance with the updated occupant determination result when the lateral acceleration difference is smaller than the lateral acceleration difference threshold value and control the airbag in accordance with the maintained occupant determination result when the lateral acceleration difference is larger than or equal to the lateral acceleration difference threshold value.

* * * * *